United States Patent
Kong et al.

(10) Patent No.: US 9,217,900 B2
(45) Date of Patent: Dec. 22, 2015

(54) LIQUID CRYSTAL DISPLAY AND MANUFACTURING METHOD THEREOF

(71) Applicant: Samsung Display Co., Ltd., Yongin, Gyeonggi-Do (KR)

(72) Inventors: Hyang-Shik Kong, Seongnam-si (KR); Sung Hoon Yang, Seoul, KS (US); Se Hwan Yu, Seoul (KR); Yong Hwan Shin, Yongin-si (KR); Su Mi Lee, Hwaseong-si (KR); Shin Il Choi, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/578,703

(22) Filed: Dec. 22, 2014

(65) Prior Publication Data

US 2015/0109563 A1    Apr. 23, 2015

Related U.S. Application Data

(62) Division of application No. 13/410,894, filed on Mar. 2, 2012, now Pat. No. 8,947,623.

(30) Foreign Application Priority Data

Oct. 11, 2011    (KR) .......................... 10-2011-0103524

(51) Int. Cl.
    *G02F 1/1343*    (2006.01)
    *G02F 1/1337*    (2006.01)
    *G02F 1/1335*    (2006.01)

(52) U.S. Cl.
    CPC ...... *G02F 1/13439* (2013.01); *G02F 1/133528* (2013.01); *G02F 2001/133548* (2013.01); *G02F 2001/133565* (2013.01)

(58) Field of Classification Search
    CPC combination set(s) only.
    See application file for complete search history.

(56) References Cited

U.S. PATENT DOCUMENTS

| | | | |
|---|---|---|---|
| 2004/0165129 A1 | 8/2004 | Okumura | |
| 2005/0162596 A1* | 7/2005 | Kim et al. | 349/134 |

(Continued)

FOREIGN PATENT DOCUMENTS

| | | |
|---|---|---|
| JP | 2009042319 A | 2/2009 |
| JP | 2009098307 A | 5/2009 |

(Continued)

OTHER PUBLICATIONS

T. Kawamura et al., 52.3: New Method of Vertical Alignment by using Nano-structure, SID 09 Digest, 2009, pp. 784-786, Sharp Corporation, Japan.

*Primary Examiner* — Wen-Ying P Chen
(74) *Attorney, Agent, or Firm* — Cantor Colburn LLP

(57) ABSTRACT

A manufacturing method of a liquid crystal display includes: forming an etch target layer including a conductive material on a first substrate; forming a first mask layer on the etch target layer; forming a block copolymer coating layer including a plurality of polymers on the first mask layer; processing the block copolymer coating layer to form a block copolymer pattern layer including first and second polymer blocks; removing one of the first or second polymer blocks to form a second mask pattern layer; etching the first mask layer by using the second mask pattern layer as an etching mask to form a first mask pattern layer; and etching the etch target layer by using the first mask pattern layer as an etching mask to form a first electrode. The first electrode includes a plurality of the first minute patterns extending in a predetermined direction and having a polarization function.

8 Claims, 14 Drawing Sheets

(56) References Cited

U.S. PATENT DOCUMENTS

| | | |
|---|---|---|
| 2008/0017884 A1 | 1/2008 | Jeong et al. |
| 2008/0074600 A1* | 3/2008 | Hsu et al. ............... 349/143 |
| 2008/0094547 A1 | 4/2008 | Sugita et al. |
| 2008/0100781 A1 | 5/2008 | Choo et al. |
| 2009/0109377 A1 | 4/2009 | Sawaki et al. |
| 2010/0157227 A1* | 6/2010 | Lu et al. ............... 349/141 |
| 2011/0063553 A1 | 3/2011 | Hanaoka et al. |
| 2012/0223355 A1 | 9/2012 | Asakawa et al. |

FOREIGN PATENT DOCUMENTS

| | | |
|---|---|---|
| KR | 1020040047328 A | 6/2004 |
| KR | 100793176 B1 | 1/2006 |
| KR | 1020070105092 A | 10/2007 |
| KR | 1020080004880 A | 1/2008 |

* cited by examiner

LIQUID CRYSTAL DISPLAY AND MANUFACTURING METHOD THEREOF

This application is a divisional application of U.S. patent application Ser. No. 13/410,894 filed on Mar. 2, 2012, and claims priority to Korean Patent Application No. 10-2011-0103524 filed on Oct. 11, 2011, and all the benefits accruing therefrom under 35 U.S.C. §119, the entire contents of which are incorporated herein by reference.

BACKGROUND OF THE INVENTION (a) Field of the Invention

The invention relates to a liquid crystal display and a manufacturing method thereof. In detail, the invention relates to a liquid crystal display including a display panel having a minute pattern and a manufacturing method thereof.

(b) Description of the Related Art

As one of widely used flat panel displays, a liquid crystal display ("LCD") includes two display panels provided with field generating electrodes such as pixel electrodes and an opposed electrode, and a liquid crystal layer interposed therebetween. The LCD displays images by applying voltages to the field-generating electrodes to generate an electric field in the LC layer that determines the orientation of LC molecules therein to adjust polarization of incident light.

The liquid crystal display is classified into a vertical alignment ("VA") mode liquid crystal display or a twisted nematic ("TN") mode liquid crystal display according to an alignment method of liquid crystal molecules. In the VA mode liquid crystal display, the LC molecules are aligned such that their long axes are perpendicular to the panels in the absence of an electric field, and thereby a high contrast ratio and a wide reference viewing angle may be easily realized. The TN mode liquid crystal display aligns LC molecules of the liquid crystal layer filled between the two display panels such that their long axes are parallel to the panels and spirally twisted with a predetermined pitch from one panel to the other panel in the absence of an electric field, thereby forming a twisted structure, such that the arrangement orientation of the long axes is continuously changed. When the electric field is generated between the electrodes formed in the two display panels, the TN mode liquid crystal display aligns the LC molecules in parallel to the field direction, e.g., perpendicular to the two panels.

The liquid crystal display may further include at least one polarizer to change transmittance of light through a polarization change of light according to an arrangement direction of the liquid crystal molecules of the liquid crystal layer. This polarizer is attached to the outside of the two display panels of the liquid crystal display, however the cost thereof is high and an additional process of attachment is required.

BRIEF SUMMARY OF THE INVENTION

The invention provides a liquid crystal display including a member having a polarizer or a polarization function and a manufacturing method thereof without attachment of a polarizer to the liquid crystal display.

The invention increases transmittance of a liquid crystal display.

The invention also simplifies a manufacturing process of a liquid crystal display.

A manufacturing method of a liquid crystal display according to an exemplary embodiment of the invention includes: forming an etch target layer including a conductive material on a first substrate; forming a first mask layer on the etch target layer; forming a block copolymer coating layer including a plurality of polymers on the first mask layer; processing the block copolymer coating layer to form a block copolymer pattern layer including a first polymer block and a second polymer block that are regularly arranged; removing one of the first polymer block and the second polymer block of the block copolymer pattern layer to form a second mask pattern layer; etching the first mask layer by using the second mask pattern layer as an etching mask to form a first mask pattern layer; and etching the etch target layer by using the first mask pattern layer as an etching mask to form a first electrode. The first electrode includes a plurality of the first minute patterns extending in a predetermined direction and having a polarization function.

The method may further include providing a second substrate facing the first substrate, and forming a liquid crystal layer interposed between the first substrate and the second substrate and including a plurality of liquid crystal molecules. Liquid crystal molecules close to the first electrode are aligned in a direction parallel to an extending direction of the first minute patterns.

The method may further include forming a second electrode including a plurality of second minute patterns extending in a direction parallel or perpendicular to the extending direction of the first minute patterns and having a polarization function on the second substrate. Liquid crystal molecules close to the second electrode are aligned in a direction parallel to an extending direction of the second minute patterns.

The liquid crystal display may include a plurality of pixels, one pixel of the plurality of pixels may include a first domain and a second domain, and the extending direction of the first minute patterns in the first domain and the extending direction of the first minute patterns in the second domain may be different from each other.

The extending direction of the first minute patterns in the first domain and the extending direction of the first minute patterns in the second domain may be perpendicular to each other.

A pitch of the plurality of the first minute patterns may be less than about 1000 nanometers (nm).

The method may further include forming a horizontal alignment layer on at least one of the first electrode and the second electrode.

Before forming the etch target layer, the method may further include forming a thin film transistor on the first substrate and forming a passivation layer on the thin film transistor. The first electrode may be connected to the thin film transistor.

The method may further include forming a horizontal alignment layer on at least one of the first electrode and the second electrode.

The first electrode may further include a plurality of minute branches extending forming an oblique angle with the extending direction of the first minute patterns, and the plurality of first minute patterns may be protruded from one minute branch in the predetermined direction.

The method may further include providing a second substrate facing the first substrate; forming a second electrode on the second substrate; forming a liquid crystal layer interposed between the first substrate and the second substrate and including a plurality of liquid crystal molecules; and forming a vertical alignment layer on at least one of the first electrode and the second electrode.

The forming of the second electrode may include forming a plurality of second minute patterns extending in a direction parallel or perpendicular to the extending direction of the first minute patterns.

A pitch of a plurality of the first minute patterns may be less than about 200 nm.

As a liquid crystal display including a plurality of pixels according to an exemplary embodiment of the invention, one pixel of a plurality of pixels includes: a first substrate and a second substrate facing each other; a liquid crystal layer interposed between the first substrate and the second substrate and including a plurality of liquid crystal molecules; a first electrode positioned on the first substrate; and a second electrode positioned on the second substrate. At least one of the first electrode and the second electrode includes a plurality of first minute patterns having a polarization function, the one pixel further includes a first domain and a second domain, and an extending direction of the first minute patterns in the first domain is different from an extending direction of the first minute patterns in the second domain.

For one electrode including a plurality of the first minute patterns, the extending direction of the first minute pattern in the first domain may be perpendicular to the extending direction of the first minute pattern in the second domain.

Liquid crystal molecules close to the electrode including the plurality of first minute patterns of the first electrode and the second electrode may be aligned in a direction substantially parallel to the extending direction of the first minute patterns.

A pitch of the plurality of first minute patterns may be less than about 1000 nm.

The liquid crystal display may further include a horizontal alignment layer positioned on at least one of the first electrode and the second electrode.

A liquid crystal display according to an exemplary embodiment of the invention includes: a first substrate and a second substrate facing each other; a liquid crystal layer interposed between the first substrate and the second substrate and including a plurality of liquid crystal molecules; a first electrode positioned on the first substrate and applied with a first voltage; a second electrode positioned on the second substrate and applied with a second voltage; and a signal line positioned on the first substrate and extending in a first direction. The first electrode includes a plurality of minute branches extending at an oblique angle with the first direction and a plurality of first minute patterns protruded from one minute branch in a predetermined direction and having a polarization function.

The second electrode may include a plurality of second minute patterns extending in a predetermined direction substantially parallel or perpendicular to an extending direction of the first minute patterns and having a polarization function.

The liquid crystal display may further include a vertical alignment layer positioned on at least one of the first electrode and the second electrode.

According to an exemplary embodiment of the invention, the manufacturing process of the liquid crystal display may be simplified, the transmittance of the liquid crystal display may be increased, and the viewing angle characteristic of the liquid crystal display may be improved.

BRIEF DESCRIPTION OF THE DRAWINGS

The above and other aspects and features of this disclosure will become more apparent by describing in further detail exemplary embodiments thereof with reference to the accompanying drawings, in which.

DETAILED DESCRIPTION OF THE INVENTION

Figure 1:
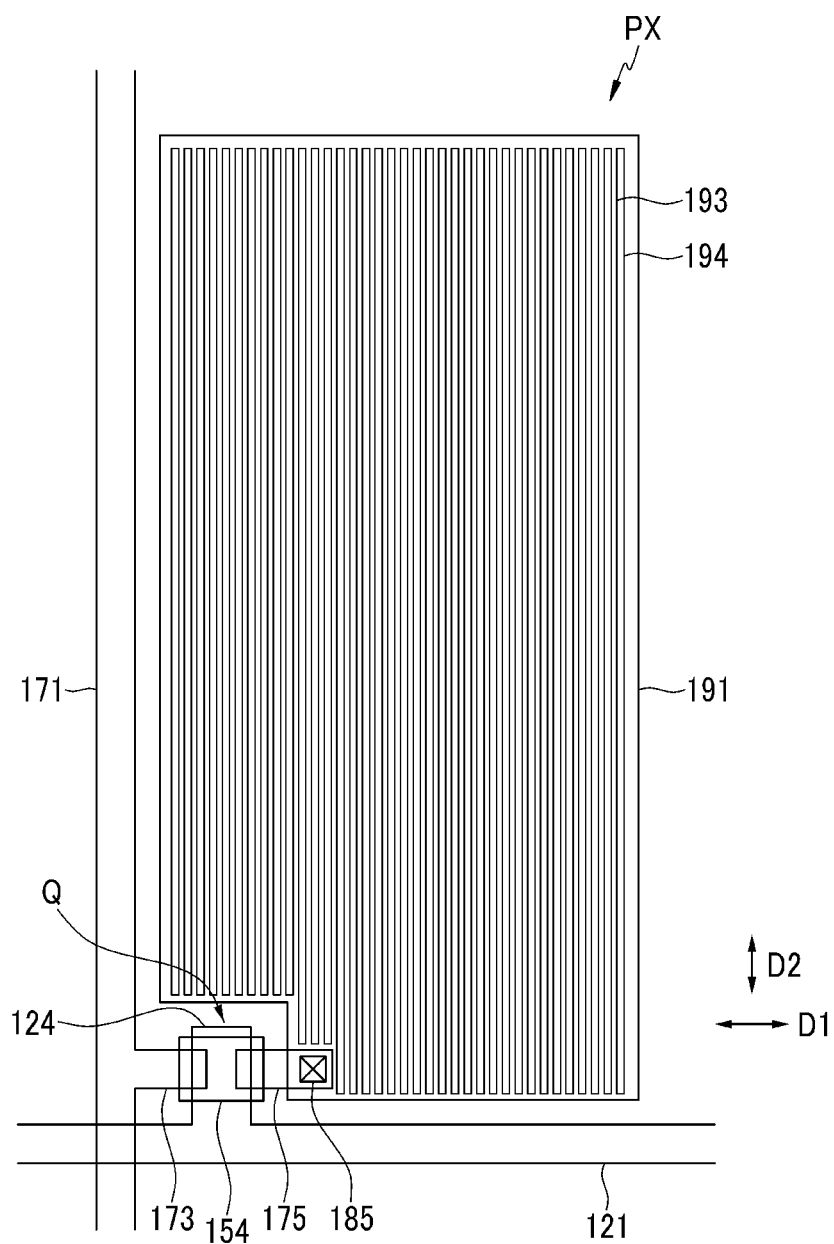
FIG. 1 is a top plan view of an exemplary embodiment of one pixel of a lower panel of a liquid crystal display according to the invention.

The invention will be described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, "connected" includes physically and/or electrically connected. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "under" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

Firstly, an exemplary embodiment of a liquid crystal display according to the invention will be described with reference to FIG. 1, FIG. 2, FIG. 3, and FIG. 4.

Figure 2:
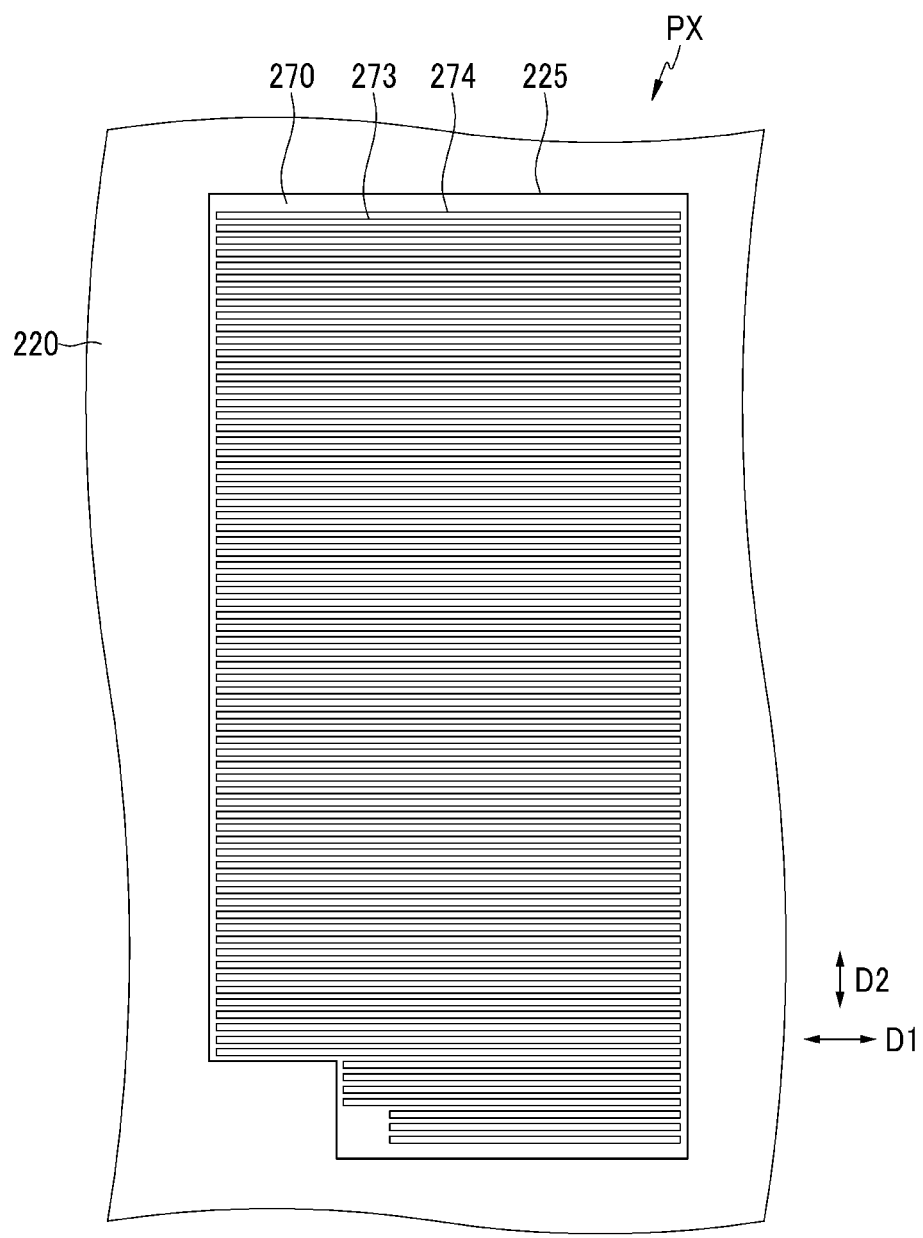
FIG. 2 is a top plan view of an exemplary embodiment of one pixel of an upper panel of a liquid crystal display according to the invention.
Figure 3:
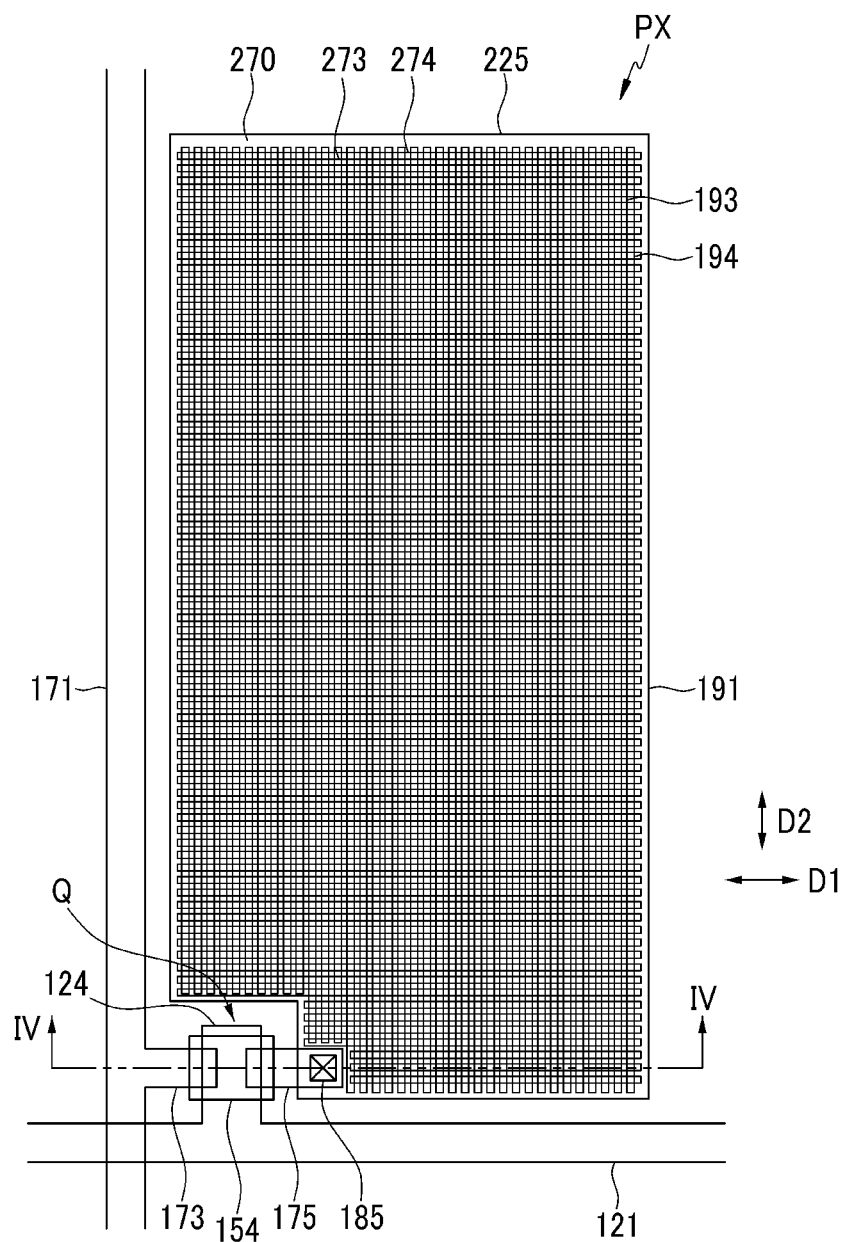
FIG. 3 is a top plan view including the lower panel of FIG. 1 and the upper panel of FIG. 2.
Figure 4:
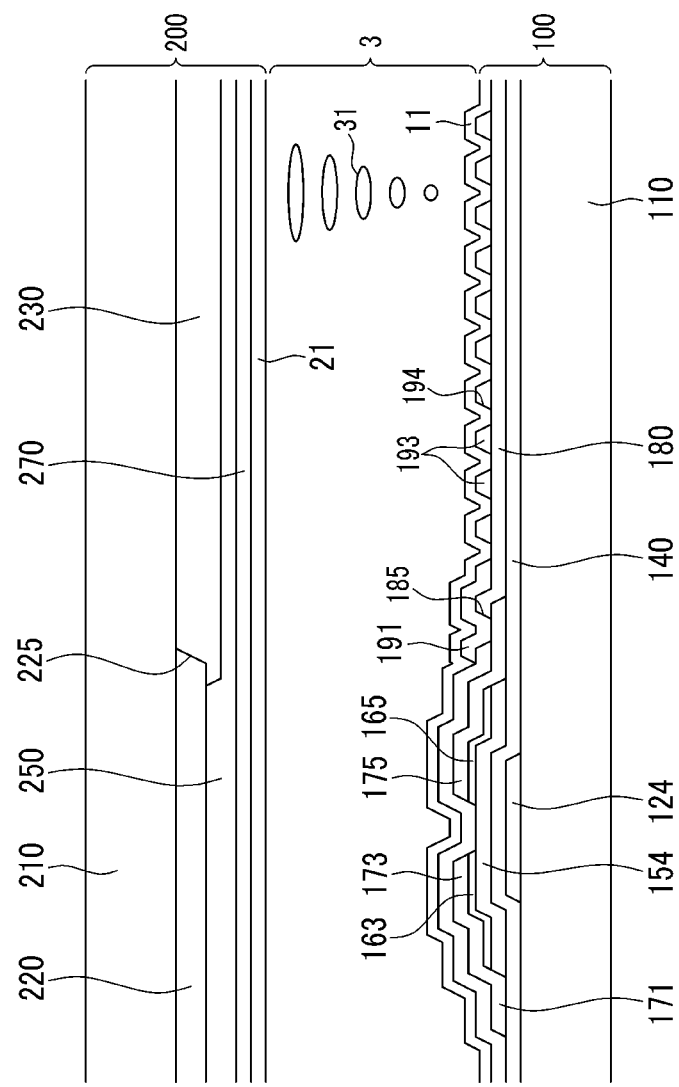
FIG. 4 is a cross-sectional view of the liquid crystal display of FIG. 3 taken along line IV-IV.

FIG. 1 is a top plan view of an exemplary embodiment of one pixel of a lower panel of a liquid crystal display according to the invention, FIG. 2 is a top plan view of an exemplary embodiment of one pixel of an upper panel of a liquid crystal display according to the invention, FIG. 3 is a top plan view including the lower panel of FIG. 1 and the upper panel of FIG. 2, and FIG. 4 is a cross-sectional view of the liquid crystal display of FIG. 3 taken along line IV-IV.

An exemplary embodiment of a liquid crystal display according to the invention includes a lower panel 100 and an upper panel 200 facing each other, and a liquid crystal layer 3 interposed therebetween.

Firstly, referring to the lower panel 100, a gate line 121 transmitting a gate signal is on an insulation substrate 110. The gate line 121 may longitudinally extend in a first direction D1 and includes a plurality of gate electrodes 124. A gate insulating layer 140 is positioned on the gate line 121, and a semiconductor 154 including hydrogenated amorphous silicon (the amorphous silicon is referred to as a-Si) or polysilicon is positioned on the gate insulating layer 140. A pair of ohmic contacts 163 and 165 are positioned on each semiconductor 154. The ohmic contacts 163 and 165 may include a material such as n+ hydrogenated amorphous silicon doped with n-type impurities such as phosphorus at a high concentration, or silicide. The liquid crystal display may include a plurality of gate lines 121.

A plurality of data lines 171 and a plurality of drain electrodes 175 transmitting a data signal are positioned on the ohmic contacts 163 and 165 and on the gate insulating layer 140. The data lines 171 may longitudinally extend in a second direction D2 perpendicular to the first direction D1 and may intersect the gate line 121. Each data line 171 includes a plurality of source electrodes 173 extending toward the gate electrodes 124, respectively. The drain electrode 175 is separated from the data line 171 and faces a source electrode 173 with respect to the gate electrode 124.

One gate electrode 124, one source electrode 173, and one drain electrode 175 form one thin film transistor ("TFT") Q along with the semiconductor 154. A channel of the TFT Q is between the source electrode 173 and the drain electrode 175, such that portions of the semiconductor 154 are exposed.

A passivation layer 180 is positioned on the data line 171, the drain electrode 175 and the exposed semiconductor 154. The passivation layer 180 has a plurality of contact holes 185 which extend completely through a thickness of the passivation layer 180, and expose a portion of the drain electrode 175.

A plurality of pixel electrodes 191 are on the passivation layer 180.

Referring to FIG. 1, an exemplary embodiment of the pixel electrode 191 according to the invention includes a plurality of minute patterns 193 longitudinally extending in a predetermined direction and substantially parallel to each other. Openings between the minute patterns 193 are referred to as minute slits 194.

A pitch of the minute pattern 193 may be less than about 200 nanometers (nm), but it is not limited thereto. The pitch may be defined by a distance between centers of adjacent minute patterns 193 or between right or left edges of adjacent minute patterns. A ratio of a width of the minute patterns 193 to a width of the minute slits 194 may be about 1:1, but it is not limited thereto. The width of the minute pattern 193 may be less than about 100 nm. The widths are taken perpendicular to a longitudinal extension direction of the minute pattern 193 and minute slit 194. A thickness of the pixel electrode 191 may be more than about 10 nm and less than about 500 nm. The thickness is taken in a direction orthogonal to both the first and second directions D1 and D2.

Referring to FIG. 1, the minute patterns 193 of the pixel electrode 191 or the minute slits 194 may be substantially parallel to the second direction D2, that is, the direction that the data line 171 is extended. However, the minute patterns 193 or the minute slits 194 may extend substantially parallel to the first direction D1, that is, the direction that the gate line 121 is extended and/or may form an oblique angle with respect to the gate line 121.

The minute patterns 193 and the minute slits 194 of the pixel electrode 191 may polarize light passing through the pixel electrode 191 in the first direction D1 as a direction perpendicular to an extending direction (the second direction D2 in FIG. 1) of the minute patterns 193 or the minute slits 194. That is, the minute patterns 193 and the minute slits 194 of the pixel electrode 191 reflect the light parallel to the extending direction of the minute patterns 193 or the minute slits 194, and transmit the light perpendicular to the extending direction of the minute patterns 193 or the minute slits 194. Accordingly, the exemplary embodiment of the pixel electrode 191 including the minute patterns 193 according to the invention has a polarization function and the direction perpendicular to the extending direction of the minute pattern

193 may be a transmissive axis of the polarization. In the exemplary embodiment of FIG. 1 to FIG. 4, the direction of the transmissive axis of the polarizer of the pixel electrode 191 is the first direction D1.

The polarization function of the pixel electrode 191 may be changed according to the wavelength of the incident light, and the width of the minute patterns 193 and the minute slits 194. When using visible rays as the incident light, if the wavelength range of the visible rays is in the range of about 380 nm to 700 nm, the width of the minute slits 194 and/or the width of the minute patterns 193 may be determined to be less than about 200 nm.

The pixel electrode 191 is physically and electrically connected to the drain electrode 175 through the contact hole 185, thereby receiving the data voltage from the drain electrode 175.

Next, referring to the upper panel 200, a light blocking member 220 is positioned on an insulation substrate 210. The light blocking member 220 is referred to as a black matrix and may reduce or effectively prevent light leaked between the pixel electrodes 191. The light blocking member 220 may include a plurality of openings 225 facing and overlapping the pixel electrode 191. Also, the light blocking member 220 may include a portion corresponding to the gate line 121 and the data line 171, and a portion corresponding to the TFT Q.

A plurality of color filters 230 may be positioned on the insulation substrate 210. The color filters 230 are disposed substantially in the areas enclosed by the light blocking member 220 in the plan view, and may extend substantially along a longitudinal direction of a row of pixel electrodes 191. The color filters 230 may represent one of primary colors, such as three primary colors of red, green and blue. At least one of the color filter 230 and the light blocking member 220 may be positioned in the lower panel 100.

An overcoat 250 is positioned on the color filter 230 and the light blocking member 220, and an opposed electrode 270 is positioned on the overcoat 250. The opposed electrode 270 may transmit a common voltage Vcom.

Referring to FIG. 2 and FIG. 3, the opposed electrode 270 has a plurality of minute patterns 273 longitudinally extending in a predetermined direction and substantially parallel to each other, and openings between the minute patterns 273 are referred to as minute slits 274. The extending direction of the minute patterns 273 and the minute slits 274 of the opposed electrode 270 may be perpendicular to the extending direction of the minute patterns 193 and the minute slits 194 of the pixel electrode 191. However, differently from FIG. 1 to FIG. 3, the extending direction of the minute patterns 273 and the minute slits 274 of the opposed electrode 270 may be parallel to the extending direction of the minute patterns 193 and the minute slits 194 of the pixel electrode 191.

A pitch of the minute pattern 273 may be less than about 200 nm, but it is not limited thereto. The pitch may be defined by a distance between centers of adjacent minute patterns 273 or between right or left edges of adjacent minute patterns 273. A ratio of a width of the minute patterns 273 to a width of the minute slits 274 may be about 1:1, but it is not limited thereto. The width of the minute patterns 273 may be less than about 100 nm. The widths are taken perpendicular to a longitudinal extension direction of the minute pattern 273 and minute slit 274. A thickness of the opposed electrode 270 may be more than about 10 nm and less than about 500 nm. The thickness is taken in a direction orthogonal to both the first and second directions D1 and D2.

The minute patterns 273 and the minute slits 274 of the opposed electrode 270 may also polarize the light passing through the opposed electrode 270 in a direction (the second direction D2 in FIG. 1) perpendicular to the extending direction (the first direction D1 in FIG. 2) of the minute patterns 273 or the minute slits 274. That is, the minute patterns 273 and the minute slits 274 of the opposed electrode 270 may reflect the light parallel to the extending direction of the minute patterns 273 or the minute slits 274, and may transmit the light perpendicular to the extending direction of the minute patterns 193 or the minute slits 194. The exemplary embodiment of the opposed electrode 270 including the minute patterns 273 according to the invention has a polarization function, and the direction perpendicular to the extending direction of the minute patterns 273 may be the transmissive axis of the polarization. In the exemplary embodiment shown in FIG. 1 to FIG. 4, the transmissive axis of the opposed electrode 270 may be the second direction D2.

The polarization function of the opposed electrode 270 may be changed according to the width of the minute patterns 273 and the minute slits 274, like the pixel electrode 191.

At least one of the pixel electrode 191 and the opposed electrode 270 may include a conductive material such as a metal or a metal alloy. In one exemplary embodiment, for example, at least one of the pixel electrode 191 and the opposed electrode 270 may include a metal such as aluminum (Al), silver (Ag), copper (Cu), molybdenum (Mo), chromium (Cr), tantalum (Ta), titanium (Ti), or alloys thereof.

Differently from the exemplary embodiment, one of the pixel electrode 191 and the opposed electrode 270 may not include the minute patterns and may include a transparent conductor such as indium tin oxide ("ITO") and indium zinc oxide ("IZO"). In this case, a polarizer may be attached to an outer surface of the display panels 100 and 200 including the other electrode in which the minute pattern is included. In one exemplary embodiment, for example, when the pixel electrode 191 includes the minute patterns 193 having the polarization function and the opposed electrode 270 does not include the minute pattern, the polarizer may be additionally attached to the upper panel 200 which includes the opposed electrode 270.

The pixel electrode 191 applied with the data voltage from the drain electrode 175 of the TFT Q generates an electric field in the liquid crystal layer 3 along with the opposed electrode 270 applied with the common voltage, to determine the direction of liquid crystal molecules 31 of the liquid crystal layer 3 between the two electrodes, thereby controlling transmittance of light to display an image. The direction of the liquid crystal molecules 31 determined according to the electric field may be changed according to refractive anisotropy of the liquid crystal molecules 31. When the liquid crystal molecules 31 have positive refractive anisotropy, the liquid crystal molecules 31 may be arranged parallel to the direction of the electric field generated to the liquid crystal layer 3.

The liquid crystal molecules 31 close to the lower panel 100 and the upper panel 200 may be aligned substantially parallel to the surface of the display panel 100 and 200 in the absence of an electric field. The arrangement structure of the liquid crystal molecules 31 further from the panels and between the lower panel 100 and the upper panel 200 may have a twisted structure in which the liquid crystal molecules 31 are spirally twisted in a direction from one display panel to the other display panel. This is referred to as a twisted nematic ("TN") mode. The polarized light passing through the lower panel 100 generates phase retardation while passing through the liquid crystal layer 3 due to the refractive anisotropy of the liquid crystal layer 3, and the phase retardation when the electric field is not generated to the liquid crystal layer 3 may be about 90 degrees.

For alignment of the liquid crystal molecules 31, a first alignment layer 11 may be coated inside the lower panel 100 and a second alignment layer 21 may be coated inside the upper panel 200. The first alignment layer 11 and the second alignment layer 21 may be horizontal alignment layers such that the liquid crystal molecules 31 are aligned substantially parallel to the surface of the display panels 100 and 200. The alignment direction of the first alignment layer 11 and the alignment direction of the second alignment layer 21 may be perpendicular or parallel to each other. In this case, when the transmissive axis direction of the lower panel 100 and the transmissive axis direction of the upper panel 200 are perpendicular to each other, the liquid crystal display may display white in the absence of the electric field generated to the liquid crystal layer 3, and this may be referred to as a normally white mode. Alternatively, when the transmissive axis direction of the lower panel 100 and the transmissive axis direction of the upper panel 200 are parallel to each other, the liquid crystal display may display black in the absence of the electric field generated to the liquid crystal layer 3, and this may be referred to as a normally black mode.

According to an exemplary embodiment of the invention, the liquid crystal molecules 31 close to the surface of the display panel 100 and 200 may be aligned according to the extending direction of the minute patterns 193 and 273 by protrusions and depressions formed by the minute patterns 193 and 273 of the pixel electrode 191 and/or the opposed electrode 270. Accordingly, without an additional rubbing process for the alignment layers 11 and 21, the arrangement direction of the liquid crystal molecules 31 close to the surface of the two display panels 100 and 200 are different from each other, and thereby the liquid crystal molecules 31 may be aligned with the twisted nematic mode. Accordingly, the manufacturing process of the liquid crystal display may be simplified. In this case, at least one of the alignment layers 11 and 21 may be omitted.

As described above, when aligning the liquid crystal molecules by using the minute patterns 193 and 273 of the pixel electrode 191 and/or the opposed electrode 270, the pitch of the minute patterns 193 and 273 may be less than about 1000 nm. The pitch may be defined by a distance between adjacent minute patterns 193 and 273 or between adjacent right or left edges of adjacent minute patterns 193 and 273. At this time, the ratio of the width of the minute patterns 193 and 273 to the width of the minute slits 194 and 274 between the minute patterns 193 and 273, may be about 1:1.

According to an exemplary embodiment of the invention, the polarizer is not attached to the lower panel 100 or the upper panel 200 and the polarization of the light may be realized such that the manufacturing process is simplified and the manufacturing cost may be reduced, and the transmittance of the liquid crystal display may be increased.

Next, other exemplary embodiments of a liquid crystal display according to the invention will be described with reference to FIG. 5, FIG. 6, and to FIG. 7 as well as the above-described drawings.

Figure 5:
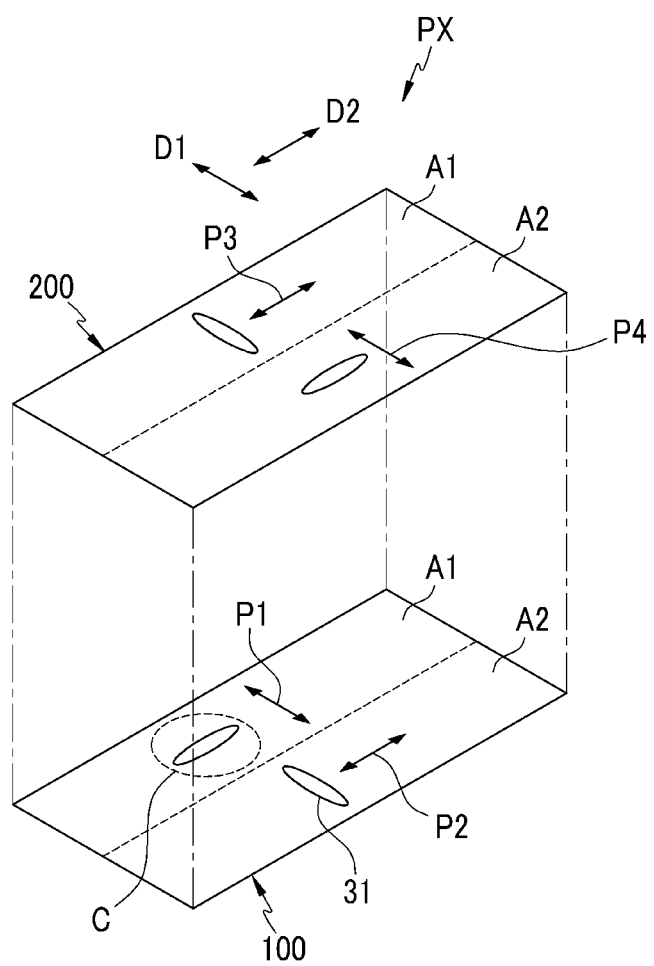
FIG. 5 is a perspective view of an exemplary embodiment of one pixel of a liquid crystal display according to the invention.
Figure 6:
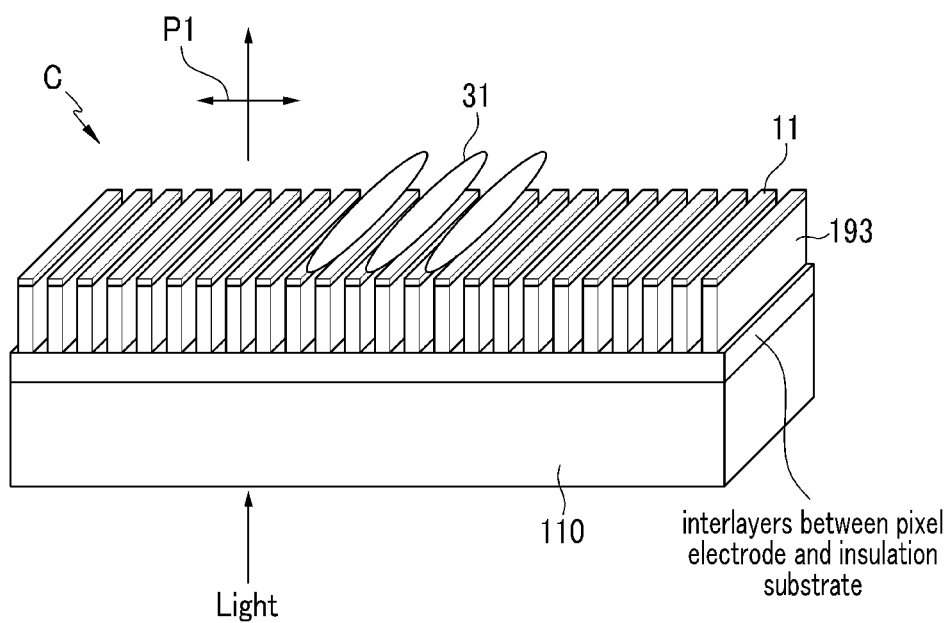
FIG. 6 is an enlarged view of portion "C" of FIG. 5.
Figure 7:
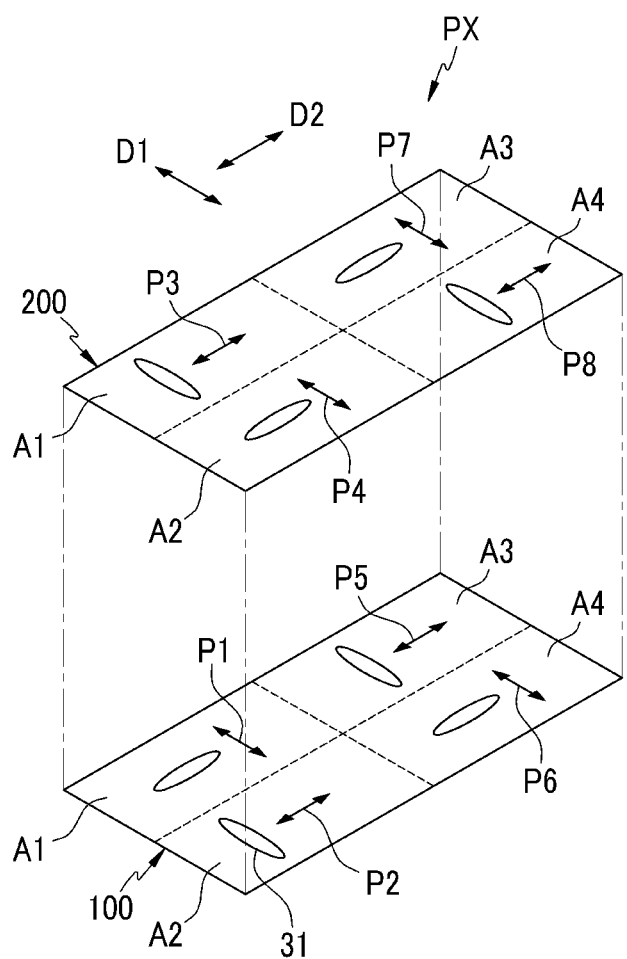
FIG. 7 is a perspective view of another exemplary embodiment of one pixel of a liquid crystal display according to the invention.

FIG. 5 is a perspective view of an exemplary embodiment of one pixel of a liquid crystal display according to the invention, FIG. 6 is an enlarged view of portion "C" of FIG. 5, and FIG. 7 is a perspective view of another exemplary embodiment of one pixel of a liquid crystal display according to the invention.

Another exemplary embodiment of a liquid crystal display according to the invention is mostly the same as the liquid crystal display shown in FIG. 1 to FIG. 4, however one pixel PX may be divided into at least two domains having different arrangement structures of the liquid crystal molecules 31.

According to the exemplary embodiment shown in FIG. 5, one pixel PX of the liquid crystal display may include a first domain A1 and a second domain A2 arranged in the plan view. In each of the domains A1 and A2, the polarization axis directions of the lower panel 100 and the upper panel 200 facing each other and the alignment directions of the liquid crystal molecules 31 close to the surface of the display panels 100 and 200 may be different from each other. Also, for each of the display panels 100 and 200, the polarization axis directions of the different domains A1 and A2 and the alignment directions of the liquid crystal molecules 31 close to the surface of the display panels 100 and 200 may be different from each other.

In detail, a plurality of domains A1 and A2 included in one pixel PX may be defined to differentiate the extending directions of the minute pattern 193 of the pixel electrode 191 or the minute patterns 273 of the opposed electrode 270. In one exemplary embodiment, for example, in the different domains A1 and A2, the extending directions of the minute patterns 193 of the pixel electrodes 191 or the minute patterns 273 of the opposed electrode 270 may be perpendicular to each other.

Referring to FIG. 5 and FIG. 6, if the lower panel 100 is described in detail, when the extending direction of the minute patterns 193 of the pixel electrode 191 is the second direction D2 in the first domain A1, the liquid crystal molecules 31 close to the surface of the lower panel 100 are aligned parallel to the extending direction of the minute pattern 193, thereby being aligned in the second direction D2. In this case, the polarization direction P1 of the light passing through the first domain A1 of the lower panel 100 may be the first direction D1 that is substantially perpendicular to the extending direction of the minute patterns 193. The extending direction of the minute patterns 193 of the pixel electrode 191 in the second domain A2 may be the first direction D1 which is a different direction from the first domain A1, and the liquid crystal molecules 31 close to the surface of the lower panel 100 may be aligned in the first direction D1. In this case, the polarization direction P2 of the light passing through the second domain A2 of the lower panel 100 may be the second direction D2.

Next, referring to the upper panel 200, the extending direction of the minute pattern 273 of the opposed electrode 270 may be the first direction D1 in the first domain A1. In this case, the liquid crystal molecules 31 close to the surface of the upper panel 200 may be aligned substantially parallel to the extending direction of the minute pattern 273. The polarization direction P3 of the light passing through the first domain A1 of the upper panel 200 may be the second direction D2 that is substantially perpendicular to the extending direction of the minute pattern 273. In the second domain A2, the extending direction of the minute pattern 273 of the opposed electrode 270 may be the second direction D2 as the different direction from the first domain A1, and in this case, the liquid crystal molecules 31 close to the surface of the upper panel 200 may be aligned in the second direction D2. In this case, the polarization direction P4 of the light passing through the second domain A2 of the upper panel 200 may be the first direction D1.

Differently from FIG. 5, the extending direction of the minute patterns 193 of the pixel electrode 191 and the extending direction of the minute patterns 273 of the opposed electrode 270 may be parallel to each other in the domains A1 and A2.

Accordingly, the alignment direction of the liquid crystal molecules 31 of the liquid crystal layer 3 of the liquid crystal display may be different in the different domains A1 and A2 while having the twisted nematic structure. In the different domains A1 and A2, the angle between the alignment directions of the liquid crystal molecules 31 may be about 90 degrees.

As described above, a plurality of domains having different alignment directions of the liquid crystal molecules 31 are defined in one pixel PX such that the reference viewing angle is wide and the visibility may be improved.

Next, the exemplary embodiment shown in FIG. 7 is the same as most of the exemplary embodiment shown in FIG. 5 and FIG. 6, however one pixel PX may include the first domain A1, the second domain A2, the third domain A3 and the fourth domain A4.

Referring to the lower panel 100, the extending direction of the minute patterns 193 of the pixel electrode 191 is the second direction D2 in the first domain A1 and the fourth domain A4 which neighbors the first domain A1 in the diagonal direction, and the liquid crystal molecules 31 close to the surface of the lower panel 100 may be aligned in the second direction D2. In the first and fourth domains A1 and A4, the polarization directions P1 and P6 passing through the lower panel 100 may be the first direction D1 that is substantially perpendicular to the extending direction of the minute patterns 193.

In the second domain A2 and the third domain A3 which neighbors the second domain A2 in the diagonal direction in the lower panel 100, the extending direction of the minute patterns 193 of the pixel electrode 191 may be the first direction D1, and in this case, the liquid crystal molecules 31 close to the surface of the lower panel 100 may be aligned in the first direction D1. In the second and third domains A2 and A3, the polarization directions P2 and P5 of the light passing through the lower panel 100 may be the second direction D2 that is substantially perpendicular to the extending direction of the minute patterns 193.

Next, referring to the upper panel 200, in the first domain A1 and the fourth domain A4, the extending direction of the minute patterns 273 of the opposed electrode 270 may be the first direction D1 that is substantially perpendicular to the extending direction of the minute patterns 193 of the pixel electrode 191 in the first and fourth domains A1 and A4 of the lower panel 100. In this case, the liquid crystal molecules 31 close to the surface of the upper panel 200 may be aligned in the first direction D1. The polarization directions P3 and P8 of the light passing through the first and fourth domains A1 and A4 may be the second direction D2 that is substantially perpendicular to the extending direction of the minute patterns 273.

In the upper panel 200, the extending direction of the minute patterns 273 of the opposed electrode 270 may be the second direction D2 in the second domain A2 and the third domain A3, and in this case, the liquid crystal molecules 31 close to the surface of the upper panel 200 may also be aligned in the second direction D2. The polarization directions P4 and P7 of the light passing through the second and third domains A2 and A3 of the upper panel 200 may be the first direction D1.

Alternatively, the extending direction of the minute patterns 273 in the domains A1, A2, A3, and A4 of the upper panel 200 may be opposite to each other.

As described above, according to the exemplary embodiment shown in FIG. 5 to FIG. 7, the liquid crystal molecules 31 of the liquid crystal layer 3 of the liquid crystal display may be aligned in the different directions in the different domains while having the twisted nematic structure. The difference of the alignment directions of the liquid crystal molecules 31 may be about 90 degrees in the neighboring domains in the first and second directions D1 and D2.

As described above, in one pixel PX, a plurality of domains having the different alignment directions of the liquid crystal molecules 31 are defined such that the reference viewing angle is wide and the visibility may be improved.

Next, another exemplary embodiment of a liquid crystal display according to the invention will be described with reference to FIG. 8, FIG. 9, FIG. 10, and FIG. 11.

Figure 8:
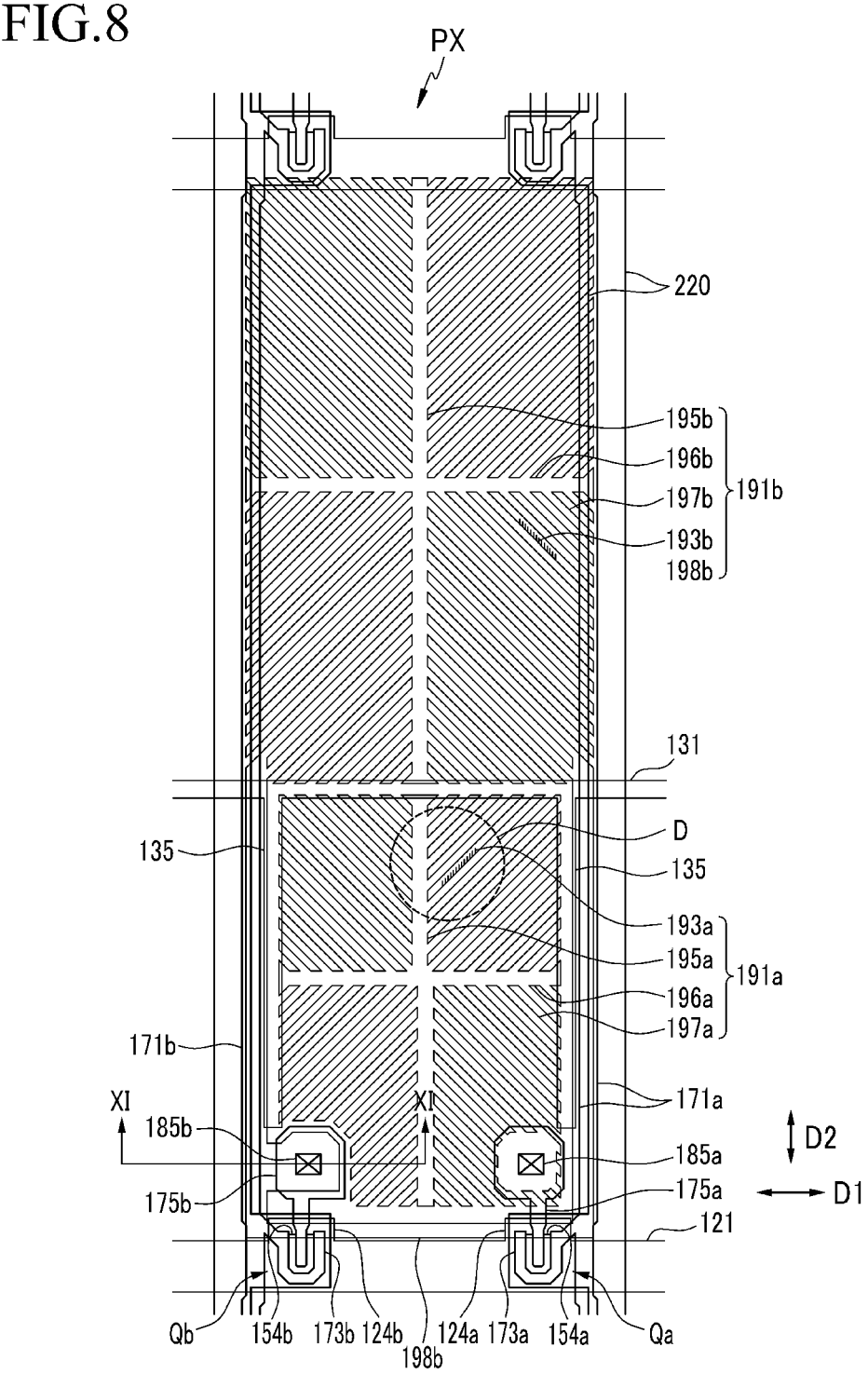
FIG. 8 is a top plan view of another exemplary embodiment of one pixel of a lower panel of a liquid crystal display according to the invention.
Figure 9:
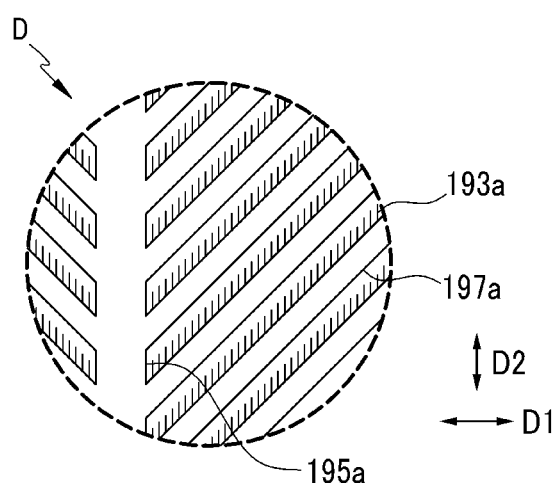
FIG. 9 is an enlarged view of portion "D" of FIG. 8.
Figure 10:
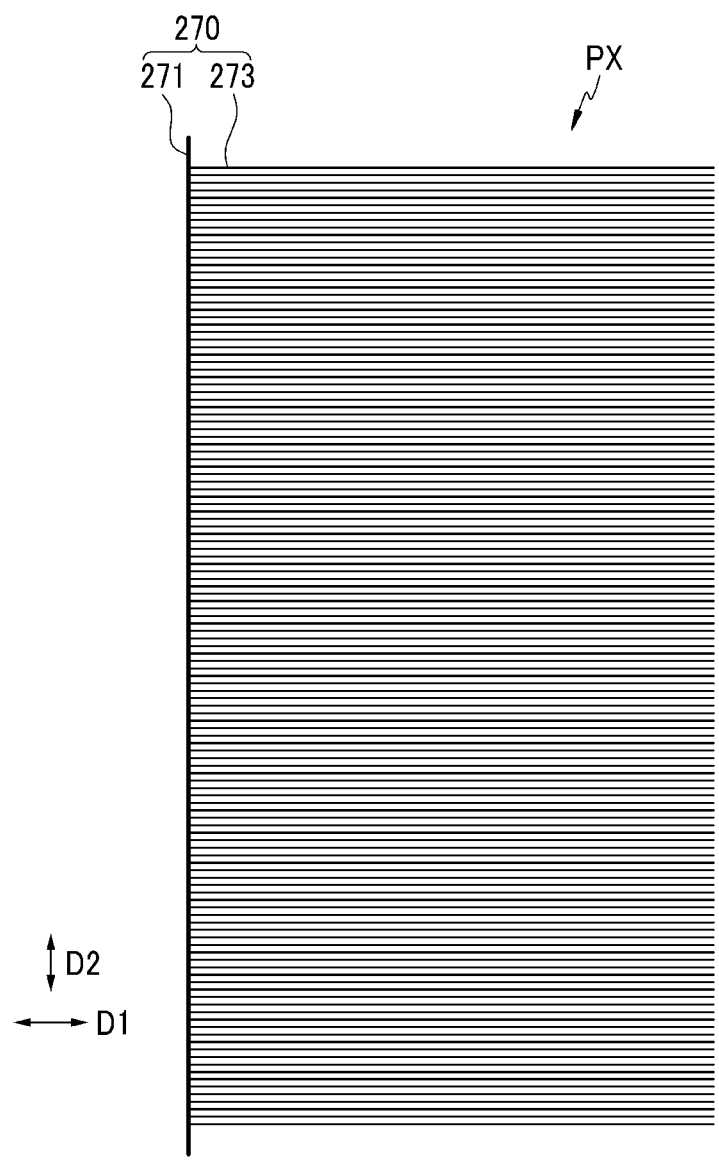
FIG. 10 is a top plan view of another exemplary embodiment of one pixel of an upper panel of a liquid crystal display according to the invention.
Figure 11:
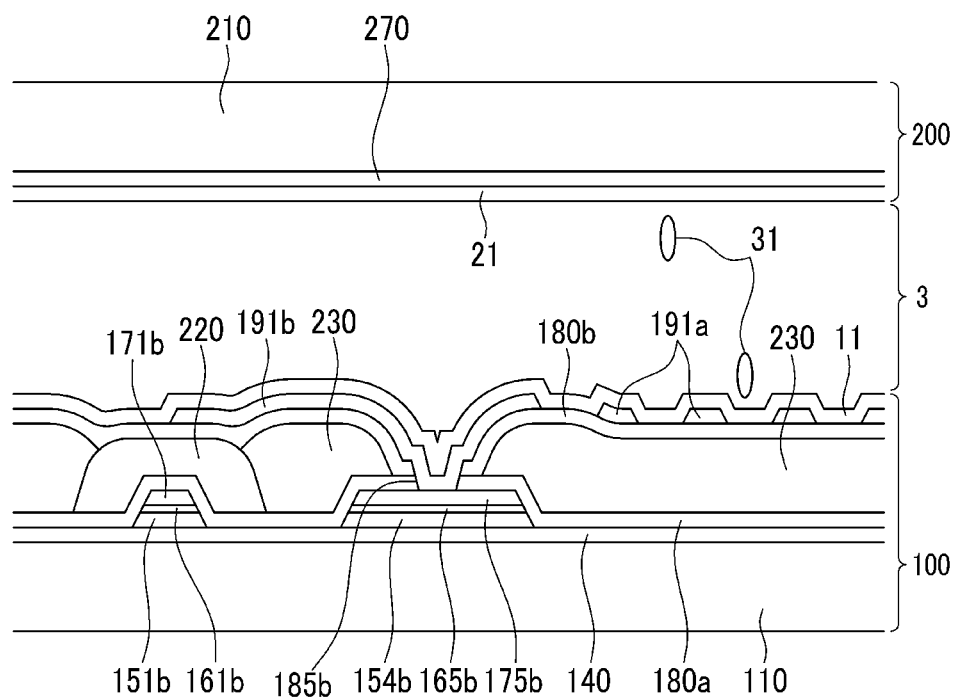
FIG. 11 is a cross-sectional view of the liquid crystal display of FIG. 8 to FIG. 10 taken along line XI-XI.

FIG. 8 is a top plan view of another exemplary embodiment of one pixel of a lower panel of a liquid crystal display according to the invention, FIG. 9 is an enlarged view of portion "D" of FIG. 8, FIG. 10 is a top plan view of another exemplary embodiment of one pixel of an upper panel of a liquid crystal display according to the invention, and FIG. 11 is a cross-sectional view of the liquid crystal display of FIG. 8 to FIG. 10 taken along line XI-XI.

The exemplary embodiment of the liquid crystal display is mostly the same as the exemplary embodiment shown in FIG. 1 to FIG. 4, and differences will be described.

Firstly, referring to the lower panel 100, a plurality of gate lines 121 and a plurality of storage electrode lines 131 are on an insulation substrate 110. Each gate line 121 may longitudinally extend in the first direction D1 and may include a plurality of first and second gate electrodes 124a and 124b. The storage electrode lines 131 may include a portion substantially parallel to the gate lines 121 and a plurality of ring portions 135 connected thereto.

A gate insulating layer 140 is on the gate lines 121 and the storage electrode lines 131, a plurality of semiconductors 151b, 154a, and 154b are further thereon, and a plurality of pairs of ohmic contacts 161b and 165b are further thereon. A plurality of pairs of data lines 171a and 171b and a plurality of pairs of first and second drain electrodes 175a and 175b are on the ohmic contacts 161b and 165b and the gate insulating layer 140. The data lines 171a and 171b respectively include the first and second drain electrodes 175a and 175b extending toward the first and second gate electrodes 124a and 124b and toward first and second source electrodes 173a and 173b facing thereto.

The first and second gate electrodes 124a and 124b, the first and second source electrodes 173a and 173b, and the first and second drain electrodes 175a and 175b respectively form first and second TFTs Qa and Qb along with the first and second semiconductors 154a and 154b.

A lower passivation layer 180a is directly on the data lines 171a and 171b, the drain electrodes 175a and 175b, and the exposed semiconductors 154a and 154b, and a light blocking member 220 is positioned thereon. A plurality of color filters 230 are directly on the lower passivation layer 180a and the light blocking member 220. At least one of the light blocking member 220 and the color filter 230 may be positioned in the upper panel 200. An upper passivation layer 180b is directly on the light blocking member 220 and the color filter 230. The upper passivation layer 180b and the lower passivation layer 180a include a plurality of contact holes 185a and 185b extending completely through a thickness thereof and exposing the first and second drain electrodes 175a and 175b, respectively.

A plurality of pixel electrodes 191 are directly on the upper passivation layer 180b. Each pixel electrode 191 may include first and second sub-pixel electrodes 191a and 191b separated from each other via a gap.

The first sub-pixel electrode 191a includes a transverse stem 196a and a longitudinal stem 195a having a substantially cross shape, and a plurality of minute branches 197a extending outward from the transverse stem 196a and the longitudinal stem 195a. The minute branches 197a may form an oblique angle with the extending direction of the gate lines 121 or the data lines 171a and 171b. One first sub-pixel electrode 191a may include at least two minute branches 197a extending in different directions.

The second sub-pixel electrode 191b includes a transverse stem 196b and a longitudinal stem 195b having a substantially cross shape, and a plurality of minute branches 197b extending outward from the transverse stem 196a and the longitudinal 195a, and a connection 198b encloses the first sub-pixel electrode 191a in the plan view. The minute branches 197b may form an oblique angle with the extending direction of the gate lines 121 or the data lines 171a and 171b. One second sub-pixel electrode 191b may include at least two minute branches 197a extending in different directions.

Referring to FIG. 8 to FIG. 11, the pixel electrode 191 includes a plurality of minute patterns 193a and 193b protruded from the minute branches 197a and 197b. In the exemplary embodiment, the length of the minute patterns 193a and 193b may be less than a distance between neighboring minute branches 197a and 197b, the length thereof is about 10 um, and more preferably about 5.0 um. The minute patterns 193a and 193b are connected to one of the neighboring minute branches 197a and 197b. The minute patterns 193a and 193b may be protruded from the minute branches 197a and 197b in the second direction D2, or in the first direction D1. When the minute patterns 193a and 193b are protruded from the minute branches 197a and 197b in the second direction D2, as shown in FIG. 9, the minute patterns 193a and 193b may be protruded in the upper direction from the minute branches 197a and 197b, or in the lower direction, in the plan view. Also, the direction (referred to as the extending direction) that the minute patterns 193a and 193b are protruded from the minute branches 197a and 197b may be uniform or different according to positions in one pixel PX.

The minute patterns 193a and 193b may linearly polarize the passing light in the extending direction of the minute patterns 193a and 193b, and the transmissive axis thereof is substantially perpendicular to the extending direction of the minute patterns 193a and 193b. Also, the size, function, and other characteristics of the minute patterns 193a and 193b may be the same as those of the minute patterns 193 in the exemplary embodiment shown in FIG. 1 to FIG. 4.

Next, referring to the upper panel 200, an opposed electrode 270 is positioned on an insulation substrate 210. Referring to FIG. 10, the opposed electrode 270 includes a plurality of minute pattern 273 substantially parallel to each other and a connection 271 connecting the plurality of minute patterns 273. The connection 271 may be extended according to one pixel array, or may only connect the minute patterns 273 of one pixel PX. The extending direction of the minute patterns 273 of the opposed electrode 270 may be the first direction D1, however, they may be substantially parallel to the extending direction of the minute patterns 193a and 193b of the pixel electrode 191.

The minute patterns 273 may linearly polarize the passing light in the extending direction of the minute patterns 273, and the transmissive axis thereby may be substantially perpendicular to the extending direction of the minute patterns 273. Also, the characteristics of the minute patterns 273 of the opposed electrode 270 according to the exemplary embodiment are the same as the characteristics of the minute patterns 273 of the exemplary embodiment shown in FIG. 1 to FIG. 4 such that the detailed description is omitted.

The liquid crystal molecules 31 of the liquid crystal layer 3 may be aligned perpendicular to the surface of the display panels 100 and 200 in the absence of the electric field. When the transmissive axis of the minute patterns 193a and 193b of the pixel electrode 191 and the transmissive axis of the minute patterns 273 of the opposed electrode 270 are perpendicular to each other, the light polarized through the pixel electrode 191 is passed through the liquid crystal layer 3 in the absence of the electric field, and then is blocked by the opposed electrode 270, thereby displaying black. In contrast, when the transmissive axis of the pixel electrode 191 and the transmissive axis of the minute patterns 273 of the opposed electrode 270 are substantially parallel to each other, white may be displayed in an absence of the electric field in the liquid crystal layer 3

For this alignment of the liquid crystal molecules 31, the first alignment layer 11 may be coated inside the lower panel 100 and the second alignment layer 21 may be coated inside the upper panel 200. The first alignment layer 11 and the second alignment layer 21 may be vertical alignment layers.

In the exemplary embodiment, if one among the pixel electrode 191 and the opposed electrode 270 does not include the minute patterns, the polarizer may be added outside the display panels 100 and 200.

Now, an exemplary embodiment of a manufacturing method of minute patterns of a liquid crystal display according to the invention will be described with reference to FIG. 12, FIG. 13, FIG. 14, FIG. 15, and FIG. 16.

FIG. 12, FIG. 13, FIG. 14, FIG. 15, and FIG. 16 are cross-sectional views showing an exemplary embodiment of a manufacturing method of a liquid crystal display according to the invention.

The exemplary embodiment of a manufacturing method of the liquid crystal display is a manufacturing method of the minute patterns included in the liquid crystal display, and the formed minute patterns may be minute patterns that transcend a resolution limitation of an optical system used in a general photolithography process. In one exemplary embodiment, for example, the minute patterns manufactured according to the exemplary embodiment may be the minute patterns 193, 193a, 193b and 273 of the above-described pixel electrode 191 or opposed electrode 270, or may be several signal lines formed on the substrate.

In the description below, an example of a method of forming the minute patterns 193, 193a and 193b of the pixel electrode 191 in the exemplary embodiment shown in FIG. 1 to FIG. 11 will be explained.

Firstly, according to the exemplary embodiments shown in FIG. 1 to FIG. 11, a gate line 121, a gate insulating layer 140, semiconductors 151b, 154, 154a and 154b, ohmic contacts 161b, 163, 165 and 165b, a data line 171, drain electrodes 175, 175a and 175b, and passivation layers 180 and 180a of the lower panel 100 are sequentially formed on an insulation substrate 110. In the case of the exemplary embodiment shown in FIG. 8 to FIG. 11, a color filter 230, a light blocking member 220 and an upper passivation layer 180b may be formed on the passivation layer 180a.

Also, in a case of the exemplary embodiment shown in FIG. 1 to FIG. 5, a light blocking member 220, a color filter 230, and an overcoat 250 forming an upper panel 200 may be formed on an insulation substrate 210 of the upper panel 200. Next, a pixel electrode 191 is formed on the passivation layer 180 or the upper passivation layer 180b of the lower panel 100, and an opposed electrode 270 is formed on the insulation substrate 210 of the upper panel 200. The formation of the pixel electrode 191 or the opposed electrode 270 may be depend on the exemplary embodiment shown in FIG. 12 to FIG. 16.

Figure 12:
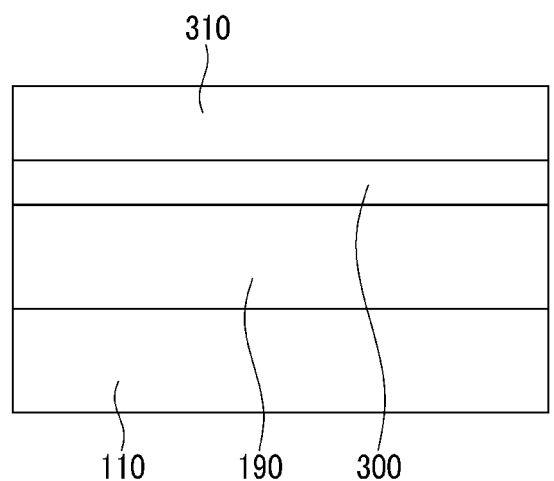
FIG. 12, FIG. 13, FIG. 14, FIG. 15, and FIG. 16 are cross-sectional views showing an exemplary embodiment of a manufacturing method of a liquid crystal display according to the invention.

Referring to FIG. 12, although not shown, an etch target layer 190 is formed on the insulation substrate 110 including a plurality of the above-described thin films. The etch target layer 190 may include a material of the minute patterns that will be finally formed. In one exemplary embodiment, for example, the etch target layer 190 may include a conductive material, a semiconductor material or an insulating material. At this time, when forming the pixel electrode 191 shown in FIG. 1 to FIG. 11 from the etch target layer 190, the etch target layer 190 may include a metal having conductivity such as aluminum. In this case, the etch target layer 190 may be connected to the drain electrodes 175, 175a and 175b of the TFTs Q, Qa and Qb through the contact holes 185, 185a and 185b of the passivation layers 180, 180a and 180b, respectively. The thickness of the etch target layer 190 may be more than about 800 Å less than 1500 Å.

Next, a first mask layer 300 is formed directly on the etch target layer 190. The first mask layer 300 may reduce or effectively prevent oxidation and corrosion of the etch target layer 190 during an etching process of a following process. For this, the first mask layer 300 may include a conductive metal oxide such as ITO and IZO. When the etch target layer 190 includes the metal such as aluminum, to improve electrical contact between the etch target layer 190 and a first mask layer 300, a buffer layer (not shown) including a metal such as molybdenum (Mo), titanium (Ti), or alloys thereof may be further formed. The thickness of the first mask layer 300 may be less than 300 nm.

Next, a block co-polymer coating layer 310 is formed directly on the first mask layer 300. An image layer (not shown) may be formed before forming the block copolymer coating layer 310. The image layer may include a disordered block copolymer of a polymer block of the same structure as each unit polymer block forming the block co-polymer coating layer 310 that will be formed thereon.

The block copolymer coating layer 310 may include a block copolymer in which at least two polymers as a repeated unit having at least two different chemical structures, are covalently bonded to each other. In one exemplary embodiment, for example, the block copolymer coating layer 310 may include a di-block co-polymer or a tri-block co-polymer. The block copolymer may include a linear or branched polymer having a molecular weight of about several thousands to several millions, for example about 3000 grams per mole (g/mol) to about 2,000,000 g/mol.

Before forming the block copolymer coating layer 310, forming a guide pattern (not shown) dividing the block copolymer coating layer 310 into a plurality of regions may be further included.

Figure 13:
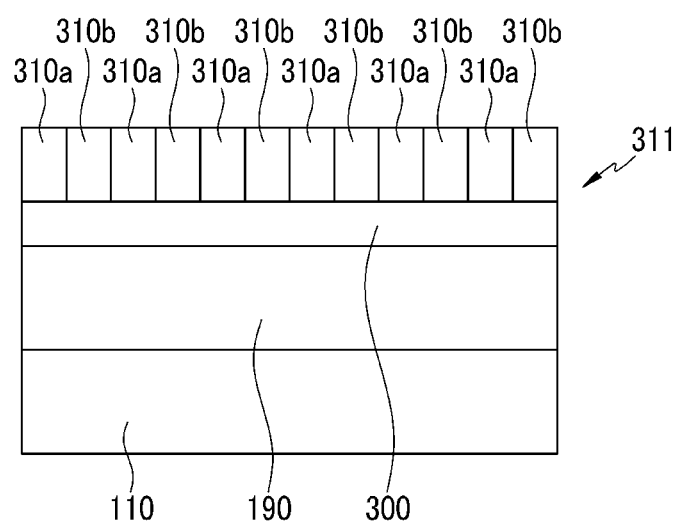

Next, referring to FIG. 13, processing such as irradiation of light such as ultraviolet ("UV") light or heat is applied to the block copolymer coating layer 310 such that the repeated units of the block copolymer within the block copolymer coating layer 310 are re-arranged. As a result, a plurality of polymer blocks are regularly arranged (self-assembled) on the etch target layer 190 or the image layer. In the exemplary embodiment of FIG. 13, the repeated units of the block copolymer of the block copolymer coating layer 310 are re-arranged, thereby forming the block copolymer pattern layer 311 in which a first polymer block 310a and a second polymer block 310b are regularly arranged. As one example, the first polymer block 310a and the second polymer block 310b may include polymethyl-methacryate ("PMMA") and polystyrene ("PS"). The first polymer block 310a and the second polymer block 310b may be alternately arranged.

The size of the first polymer block 310a and the second polymer block 310b of the block copolymer pattern layer 311 may depend on the size of the minute pattern to be manufactured. In the exemplary embodiment, the pitch of the block copolymer pattern layer 311 may be less than about 200 nm, and the ratio of the widths of the first polymer block 310a to the widths of the second polymer block 310b may be about 1:1. When aligning the liquid crystal molecules by the formed minute pattern, the pitch of the block copolymer pattern layer 311 may be less than about 1000 nm.

Figure 14:
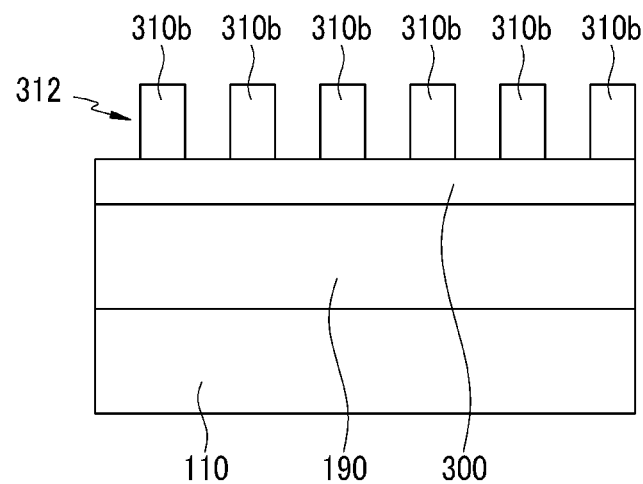

Next, referring to FIG. 14, each of one of the first polymer block 310a and the second polymer block 310b of the block copolymer pattern layer 311 is removed to form a second mask pattern layer 312. When removing one of the first polymer block 310a and the second polymer block 310b, an ashing process or a dry etching process may be used, and in this case, a gas having different ashing speeds or etching speeds for the first polymer block 310a and the second polymer block 310b may be used. In one exemplary embodiment, for example, when the first polymer block 310a and the second polymer block 310b respectively include PMMA and PS, an etching gas like an oxygen-containing gas such as $O_2$, CO and $CO_2$, a nitrogen-containing gas such as $N_2$ and $NH_3$, a chlorine-containing gas such as $Cl_2$, HCl and $BCl_3$, a bromine-containing gas such as HBr and $Br_2$, or a mixed gas thereof may be used, or a gas such as argon (Ar) and helium (He) may be added to the etching gas to ash the block copolymer pattern layer 311. At this time, the first polymer block 310a include PMMA may be removed earlier than the second polymer block 310b including PS.

The formation method of the second mask pattern layer 312 is not limited thereto, and various methods of forming the minute patterns disclosed in prior art may be applied.

Figure 15:
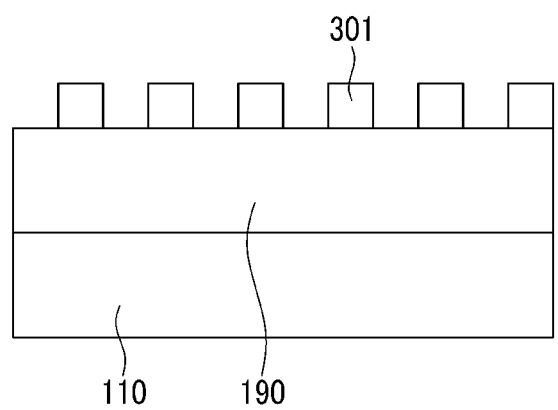

Next, referring to FIG. 15, the first mask layer 300 is etched by using the second mask pattern layer 312 as an etching mask to form a first mask pattern layer 301. At this time, the first mask layer 300 may be etched by using dry etching or wet etching.

When the thickness of the first mask layer 300 is relatively thin, the underlying etch target layer 190 may be simultaneously etched when etching the first mask layer 300. In this case, the first mask layer 300 may be easily etched by the etch condition to etch the underlying etch target layer 190. Accordingly, it is preferable that the etching speed of the first mask layer 300 is slower than the etching speed of the etch target layer 190 so as to not remove all of the first mask layer 300 before the etch target layer 190 is sufficiently etched.

Figure 16:
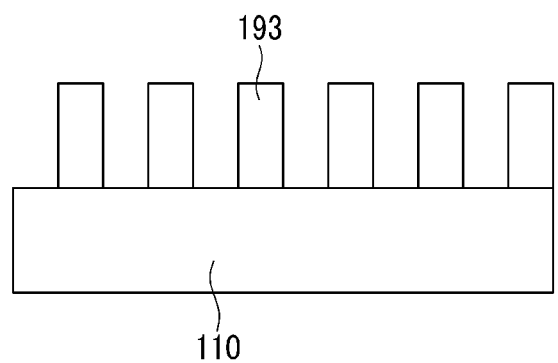

Next, referring to FIG. 16, the remaining etch target layer 190 is etched by using the first mask pattern layer 301 as the etching mask to form the minute patterns 193. The etch target layer 190 may be etched by using dry etching or wet etching. When the etch target layer 190 is dry-etched, at least one of etch gases such as $Cl_2$, $BCl_3$ and $CHF_3$ may be used. A side surface of the etched minute pattern 193 may form an angle of more than about 80 degrees and less than about 100 degrees with respect to the surface of the insulation substrate 110. To provide an effective polarization function to the minute patterns 193, it is preferable that the side surface of the etched minute patterns 193 forms an angle closer to about 90 degrees with respect to the surface of the insulation substrate 110.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a plurality of pixels,
wherein one pixel of the plurality of pixels includes:
- a first substrate and a second substrate which face each other;
- a liquid crystal layer between the first substrate and the second substrate and including a plurality of liquid crystal molecules;
- a first electrode on the first substrate; and
- a second electrode on the second substrate,
- wherein at least one of the first electrode and the second electrode includes a plurality of first minute patterns which is elongated in an extending direction and has a polarization function, such that light passing through the plurality of first minute patterns, is linearly polarized by the plurality of first minute patterns in a direction substantially perpendicular to the extending direction of the first minute patterns, the one pixel further includes a first domain and a second domain, and
the extending direction of the first minute patterns in the first domain is different from the extending direction of the first minute patterns in the second domain.

2. The liquid crystal display of claim 1, wherein
the extending direction of the first minute patterns in the first domain is substantially perpendicular to the extending direction of the first minute patterns in the second domain.

3. The liquid crystal display of claim 2, wherein
liquid crystal molecules close to the electrode including the plurality of first minute patterns are aligned in a direction substantially parallel to the extending direction of the first minute patterns.

4. The liquid crystal display of claim 3, wherein
a pitch of the plurality of first minute patterns is less than 1000 nanometers.

5. The liquid crystal display of claim 4, further comprising
a horizontal alignment layer on at least one of the first electrode and the second electrode.

6. A liquid crystal display comprising:
- a first substrate and a second substrate which face each other;
- a liquid crystal layer between the first substrate and the second substrate and including a plurality of liquid crystal molecules;
- a first electrode which is on the first substrate and receives a first voltage;
- a second electrode which is on the second substrate and receives a second voltage; and
- a signal line which is on the first substrate and extends in a first direction,
wherein the first electrode includes:
  - a plurality of minute branches which extends at an oblique angle with the first direction, and
  - a plurality of first minute patterns which is elongated from one minute branch in an extending direction and has a polarization function, such that light passing through the plurality of first minute patterns, is linearly polarized by the plurality of first minute patterns in a direction substantially perpendicular to the extending direction of the first minute patterns.

7. The liquid crystal display of claim 6, wherein
the second electrode includes a plurality of second minute patterns which is elongated in an extending direction substantially parallel or perpendicular to the extending direction of the first minute patterns and has a polarization function, such that light passing through the plurality of second minute patterns, is linearly polarized by the plurality of second minute patterns in a direction substantially perpendicular to the extending direction of the second minute patterns.

8. The liquid crystal display of claim 7, further comprising
a vertical alignment layer on at least one of the first electrode and the second electrode.

* * * * *